United States Patent
Jones

(10) Patent No.: US 9,830,790 B2
(45) Date of Patent: Nov. 28, 2017

(54) SMART DOOR DEVICE

(71) Applicant: Joseph Jones, Brooklyn, NY (US)

(72) Inventor: Joseph Jones, Brooklyn, NY (US)

( * ) Notice: Subject to any disclaimer, the term of this patent is extended or adjusted under 35 U.S.C. 154(b) by 23 days.

(21) Appl. No.: 14/999,952

(22) Filed: Jul. 18, 2016

(65) Prior Publication Data

US 2017/0301202 A1    Oct. 19, 2017

Related U.S. Application Data

(63) Continuation-in-part of application No. 12/855,120, filed on Aug. 12, 2010, now abandoned.

(60) Provisional application No. 61/281,865, filed on Nov. 24, 2009.

(51) Int. Cl.

| | |
|---|---|
| *G08B 13/00* | (2006.01) |
| *G08B 13/196* | (2006.01) |
| *G08B 25/00* | (2006.01) |
| *G08B 5/38* | (2006.01) |
| *H04W 84/12* | (2009.01) |
| *H04W 4/00* | (2009.01) |

(52) U.S. Cl.
CPC ......... *G08B 13/19602* (2013.01); *G08B 5/38* (2013.01); *G08B 13/19617* (2013.01); *G08B 13/19626* (2013.01); *G08B 25/00* (2013.01); *H04W 4/008* (2013.01); *H04W 84/12* (2013.01)

(58) Field of Classification Search
CPC ...... H04N 7/186; H04N 7/183; H04N 5/2252; H04N 5/23241; H04N 5/23245; H04N 5/23293; H04N 5/2351; H04N 5/33; H04N 7/18; H04N 7/185; H04N 7/188; E06B 7/30; H04M 11/02; H04M 1/0291; H04M 1/72533
See application file for complete search history.

(56) References Cited

U.S. PATENT DOCUMENTS

| | | | | |
|---|---|---|---|---|
| 2007/0290789 | A1* | 12/2007 | Segev | E05B 47/0657 340/5.6 |
| 2008/0247609 | A1* | 10/2008 | Feris | G06K 9/00228 382/118 |

\* cited by examiner

*Primary Examiner* — Omeed Alizada

(57) ABSTRACT

Smart Door device is a two-part single compact fully automated HD digital surveillance unit, comprising smart phone technology and tablet technology and complex computer sound, light and motion sensors. Speech technology Photographic technology, toxin and metal detector, GPS, alarms and LED scrolling display and intercom, all internal parts, a two part unit that's connected to each other through a hole in the upper center of the door, an intelligent identifying system that providing information and accurately answers questions by phone or at door.

6 Claims, 10 Drawing Sheets

SMART DOOR DEVICE

REFERENCE TO RELATED APPLICATIONS

This patent application claims the benefit of U.S. Provisional Application No. 61/281,865 filed on Nov. 24, 2009, the disclosure of which is incorporated herein in its entirety by reference.

FIELD OF THE INVENTION

The present invention relates to a smart door. The door comprises devices for monitoring activity at the door, providing alarms at the door and providing information from devices at the door.

BACKGROUND OF THE INVENTION

U.S. Pat. No. 6,919,918 relates to an electronic digital door opener, comprising a digitalization, recording and control block that is connected between the street plate and the interior plates. Said block has sound recording, playback and processing means, video and data sequencing, in addition to means for controlling functions of the door opener. Each interior plate can be complemented with a remote control to enable audio and data communication with the street plate. Audiovisual and data communication with said plate can be enabled by means of a television set. A portable, mobile unit with television function enables audiovisual and data communication with the street plate either directly or by means of a television set. Each interior plate and the digitization, recording and control block may be connected to a remote localization module that makes it possible to relate audio, video and data communication and the controls of the door opener with a remote computer, remote telephone or the like.

US patent publication 20100148957 relates to a security system which includes a warning notification module adapted to recognize at least one of a wireless or audible signal. A door bell ringer or emergency transmission signal from a wireless transmitter can provide a recognition signal to a microprocessor in the security system via the warning notification module. The microprocessor retrieves dog barking sounds stored in memory and provides them to at least one of an amplifier or radio frequency transmitter after the microprocessor receives the recognition signal from the warning notification module. Dog barking sounds can be broadcasted using the wireless transmitter. Processing can be with a time delay after first receipt of the recognition signal. A random module can enable random retrieval of various dog barking sounds from memory for processing. A time out module can disable operation of the microprocessor at a set time after recognition signal receipt.

US patent publication 20090284600 relates to a remote-control door viewer surveillance system which includes a door viewer holding a lens assembly in the door panel of a house, an image sensor for picking up image signals through the lens assembly, an image processing circuit for processing image signals received from the image sensor into digital image signals, a monitor for displaying images of digital image signals outputted by the image processing circuit, a communication module for transmitting digital image signals outputted by the image processing circuit to the user's mobile phone, a memory for storing digital image signals outputted by the image processing circuit for further review, and a TCP/IP equipment for transmitting the digital image signal outputted by the image processing circuit to a computer at a predetermined IP address for monitoring and storage.

US patent publication 20090273670 relates to a remote viewing system for providing video surveillance of an entry or doorway of a building. A video camera is positioned to obtain video images of the entryway or doorway and to transmit them to a remote viewing station. Video data can be transmitted from the driver to any of a variety of electronic devices, including PCs, PDAs, cell phones, and the like. The video information can also be stored for future reference.

US patent publication 20080239072 relates to a door monitor with a portable storage medium includes a host module disposed behind the door, a night-vision camera module disposed outside the door and electrically connected with the host module, a sensor disposed outside the door for detecting whether any object is approaching, and a microphone connected with the host module. The host module has a multimedia processor, a display, a touch panel, and a portable storage medium connecting interface. The user enters monitoring criteria using the touch panel. When an object approaches and stays for a period of time, the night-vision camera module starts recording. The recorded video data are sent to and played on the display. The video data are compressed in a format and stored on the portable storage medium. The door monitor readily monitors situations outside the door and records and stores video images for the purposes of home security.

SUMMARY OF THE INVENTION

The present invention relates to a smart door. The door provides devices for monitoring activity around the door, providing alarms and providing the user information at the door.

The door comprises an area outside of the door and an area inside the door.

It is an object of the present invention for the door to have a peephole. It is an object of the present invention for the peephole to comprise a high power camera lens that allows a user to see in low light night vision with a wide lens. It is an object of the present invention for the door to comprise a microphone. It is an object of the present invention for the door to comprise sensors. It is an object of the present invention for the door to comprise an intercom. It is an object of the present invention for the door to comprise a doorbell.

It is an object of the present invention for the inside of the door to comprise a flat touch screen monitor. It is an object of the present invention for the monitor to have a menu with a function display. It is an object of the present invention for the door to comprise a billboard reminder of things that need to be done. It is an object of the present invention for the door to have a device on it which gives the time, date and temperature. It is an object of the present invention for a device on the inside of the door to provide weather, news, and/or traffic reports. It is an object of the present invention for the keyboard display to have picture within a picture.

It is an object of the present invention for the door to comprise an I-phone. It is an object of the present invention for the door to comprise I pad technology. It is an object of the present invention for the I pad technology to be in a glow in the dark frame.

It is an object of the present invention for the inside of the door to have an intercom button. It is an object of the present invention for the inside of the door to comprise a knob or other device for rotating the camera lens in the peephole.

It is an object of the present invention for the computer controls to have a panel with Intel and 4G or 3G network cell phone technology. It is an object of the present invention for the computer to have switches and buttons for home or away. It is an object of the present invention for the computer to comprise connecting input and output terminals.

It is an object of the present invention for the computer to comprise USB and memory card access. It is an object of the present invention for the computer to have a pull out keyboard. It is an object of the present invention for the computer to be powered by a battery. It is an object of the present invention for the computer to be powered by a charger. It is an object of the present invention for the computer to be powered by a supply cord attached to an outlet. It is an object of the present invention for the computer to work with a blue tooth when a user is out but nearby.

It is an object of the present invention to provide a monitor or program that allows a user inside the house to see on any TV in the person's home who is at the door.

It is an object of the present invention to provide a doorbell which plays ring tones. It is an object of the present invention for the ring tones to be downloaded or made by the owner. It is an object of the present invention for an air freshener to be placed on the door to eliminate odors by the door.

It is an object of the present invention for a camera or video device to be placed on the door and take pictures and videos of persons who present themselves in front of the door. It is an object of the present invention for a device which is part of the door to save the pictures and videos.

It is an object of the present invention for a recording device to be integrated or attached to the door that a user can leave an automated recording informing a person at the door that no one is home and at what moment a person will be returning home.

It is an object of the present invention for a recording device to be integrated or attached to the door so that a person on the outside of the door can leave a message to the people who live in the home or apartment.

It is an object of the present invention for the intercom button to allow a user to call a person's cell phone.

It is an object of the present invention to program the door to text a picture or video, email, phone, computer or web cam.

It is an object of the present invention to program the door to text a picture, or videos, and automatically email the user when the door is opened by persons outside or inside the home or apartment.

It is an object of the present invention for the control panel to be able to see inside and take pictures of people leaving the home or apartment. It is an object of the present invention for the door to comprise a smoke detector. It is an object of the present invention for the door to comprise a carbon monoxide detector.

It is an object of the present invention for the door to have a sensor alarm around the door. It is an object of the present invention for the sensor alarm to tell the owner if someone is trying to forcibly open the door. It is an object of the present invention that if the sensor alarm detects someone trying to forcibly open the door, the alarm will call the police or private security group. It is an object of the present invention that the alarm when it notifies the police or security will provide the name and address of home or apartment being broken into.

It is an object of the present invention for the door to have a sound sensor. It is an object of the present invention for a user to program the sound sensor to pick up sounds outside of the door. It is an object of the present invention for the sound sensor to pick up sounds for a certain amount of time, and if the sounds continue for a certain amount of time, an alarm sounds.

It is an object of the present invention for the door to have a control panel inside the home to dial 911, when a person inside the home shouts for 911 or for help. It is an object of the present invention for the control panel to have an automated recording for help with the person's address and phone number. It is an object of the present invention for the voice command to be able to used in other rooms of the house or apartment.

It is an object of the present invention for the door to be connected to other security devices within a building.

It is an object of the present invention to program an alarm setting to off, high or low.

It is an object of the present invention for the alarm to be a voice or the sound of a siren.

It is an object of the present invention to not make any sounds but to send a signal, message, text, picture, video or e-mail to alert someone with regards to the alarm.

It is an object of the present invention for an indicator on the monitor to tell a user the status of the alarms.

BRIEF DESCRIPTION OF THE INVENTION

DETAILED DESCRIPTION

Figure 1:
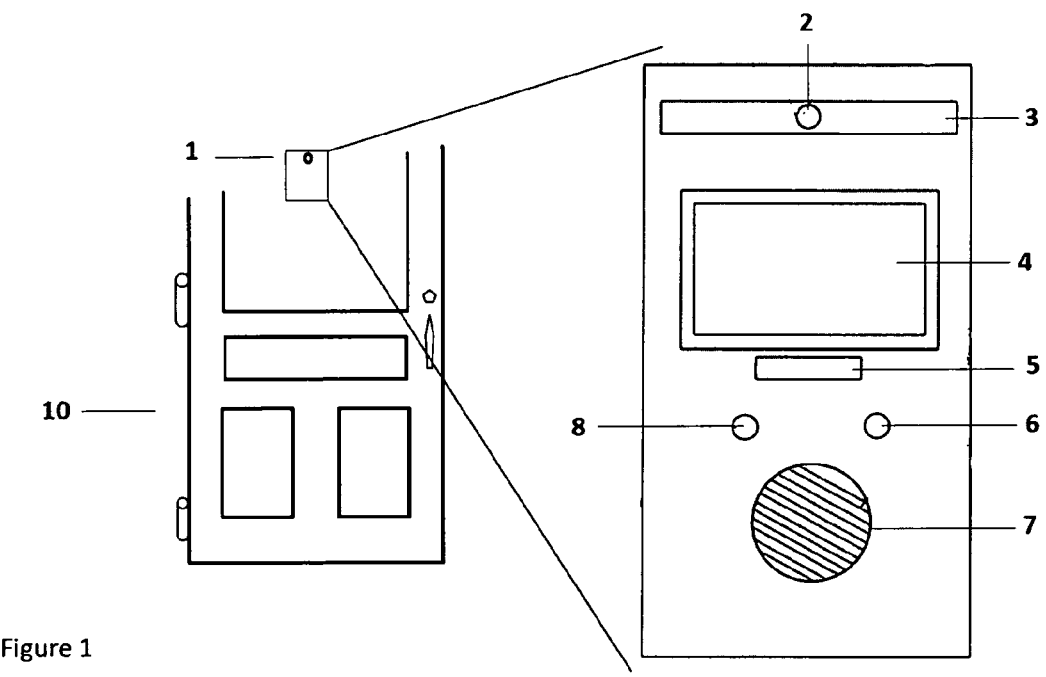
FIG. 1 illustrates a front view of the outside of the door of the present invention.

FIG. 1 shows the outside of a door 10, having a doorbell and intercom 12 and a peephole 14 having a camera 16 within it.

Figure 2:
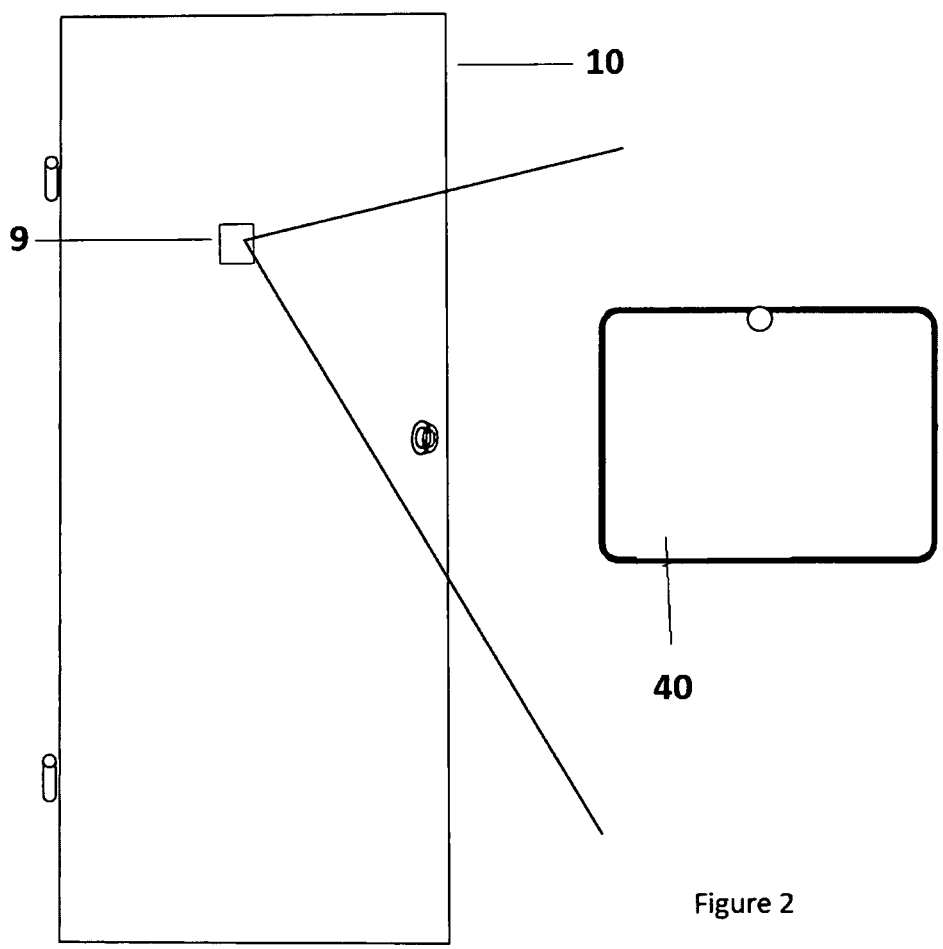
FIG. 2 illustrates a front view of the inside of the door of the present invention.

FIG. 2 shows the inside of a door 20, having a monitor 22 and controls for the monitor 24.

Figure 3:
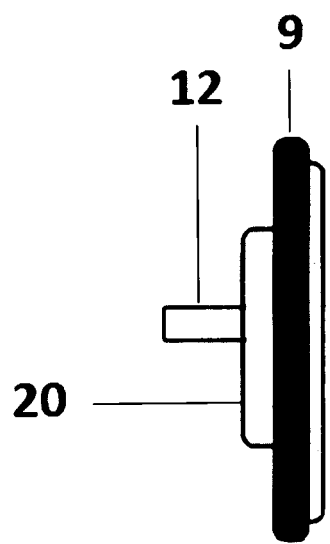
FIG. 3 illustrates a monitor used in an embodiment of the present invention.

FIG. 3 shows the side view of a monitor 26 which is used with a door of the present invention.

Figure 4:
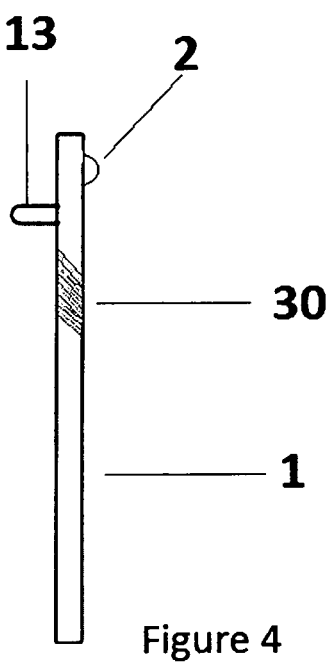
FIG. 4 illustrates a camera used in an embodiment of the present invention.

FIG. 4 shows a camera 28 used in a door of the present invention. The camera can be fitted into a peephole of the door or placed in another area of the door.

Figure 5:
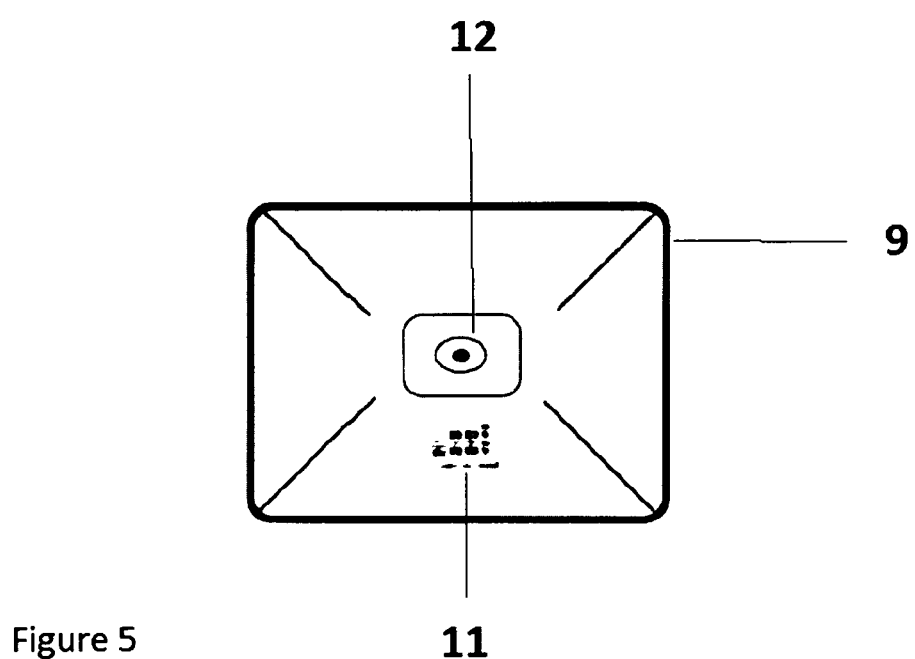
FIG. 5 illustrates shows program controls used in an embodiment of the present invention.

FIG. 5 shows the program controls 30 used in connection with a door of the present invention.

Figure 6:
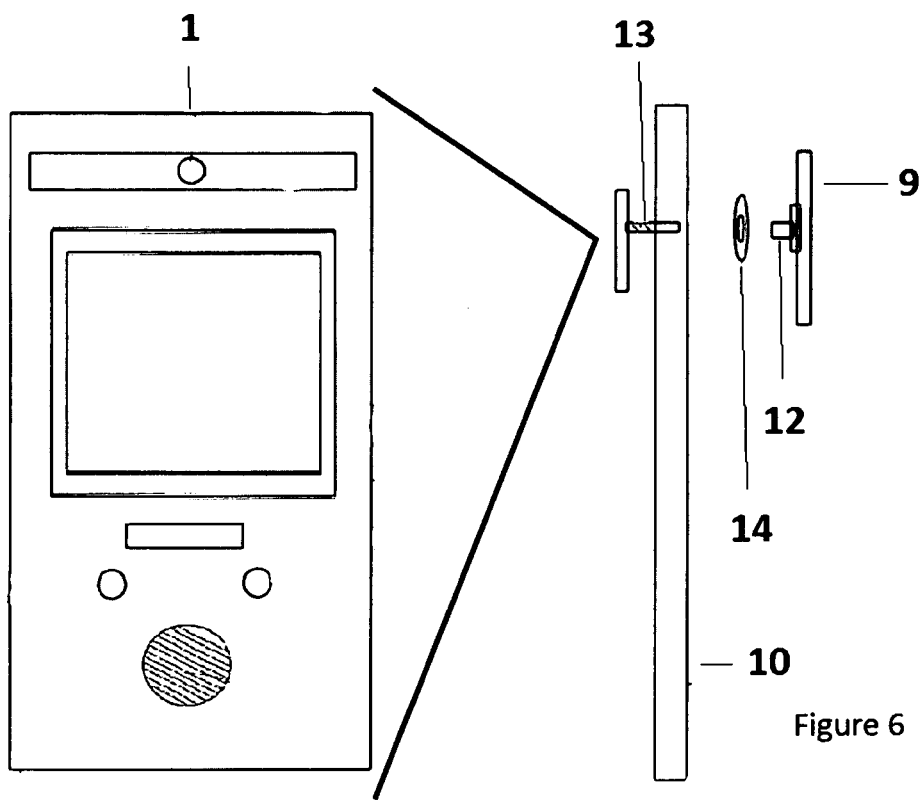
FIG. 6 shows an intercom and bell used in an embodiment of the present invention.

FIG. 6 shows an intercom and bell 32 which is used in connection with the door of the present invention.

Figure 7:
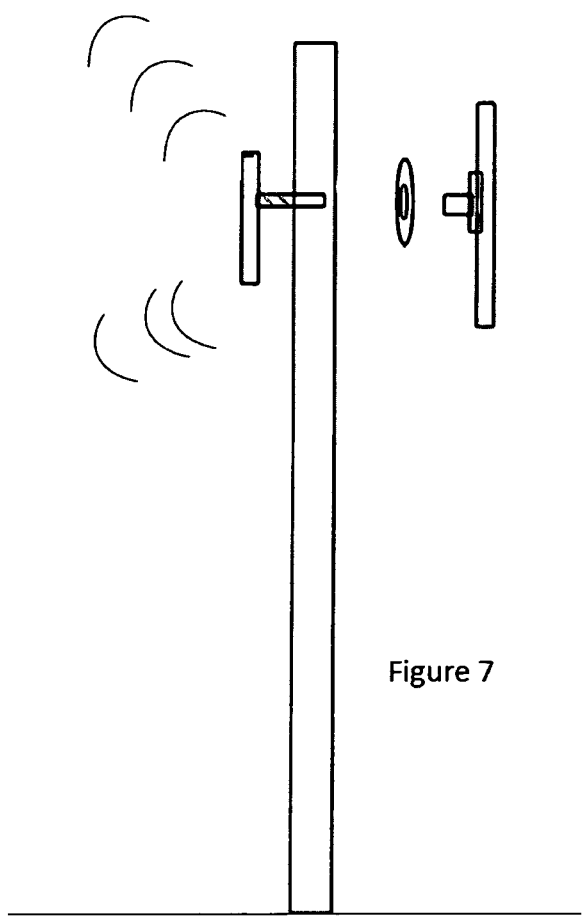
FIG. 7 shows a monitor used in an embodiment of the present invention.

FIG. 7 shows a monitor 34 used in connection with the door of the present invention.

Figure 8:
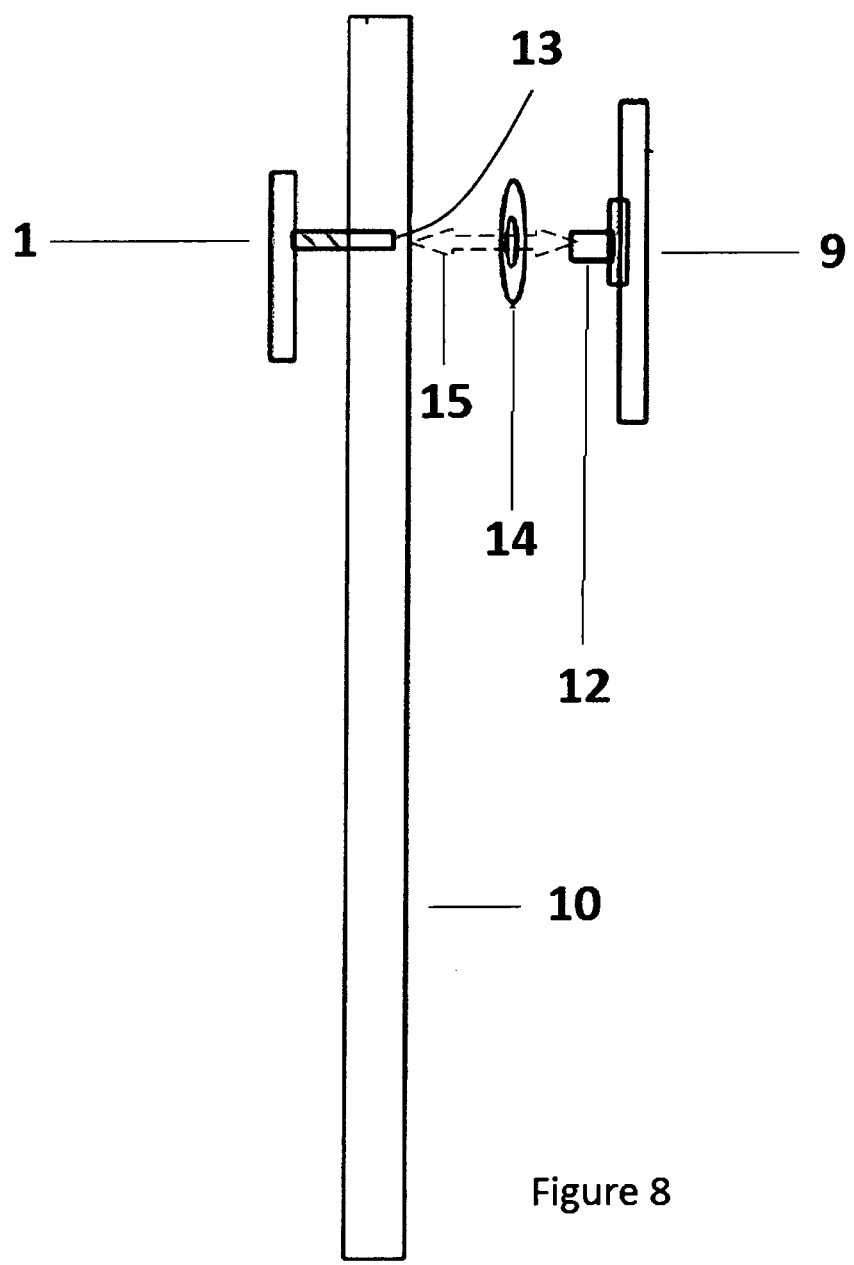
FIG. 8 shows a front view of a door used in an embodiment of the present invention.

FIG. 8 shows a door 50 having a pivoting member 52. When the pivoting member is open, a camera lens 54 is inside the pivoting member. The door 50 also contains doorbell sensors 56 an a microphone intercom 58. The door 50 further contains a smoke and carbon monoxide detector 60. The door further contains a battery 62.

Figure 9:
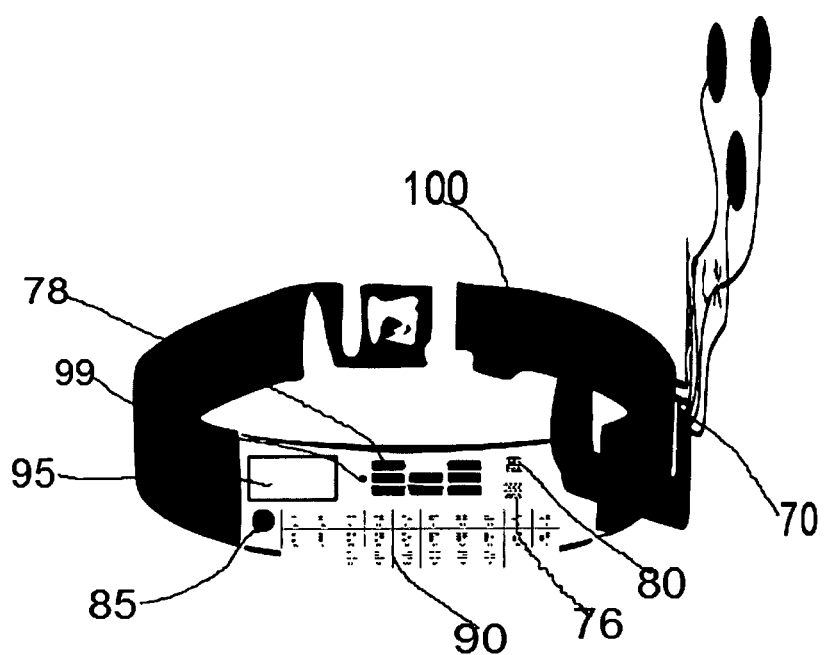
FIG. 9 shows an alarm used in an embodiment of the present invention.

FIG. 9 shows an alarm 70 used in connection with the door of the present invention.

Figure 10:
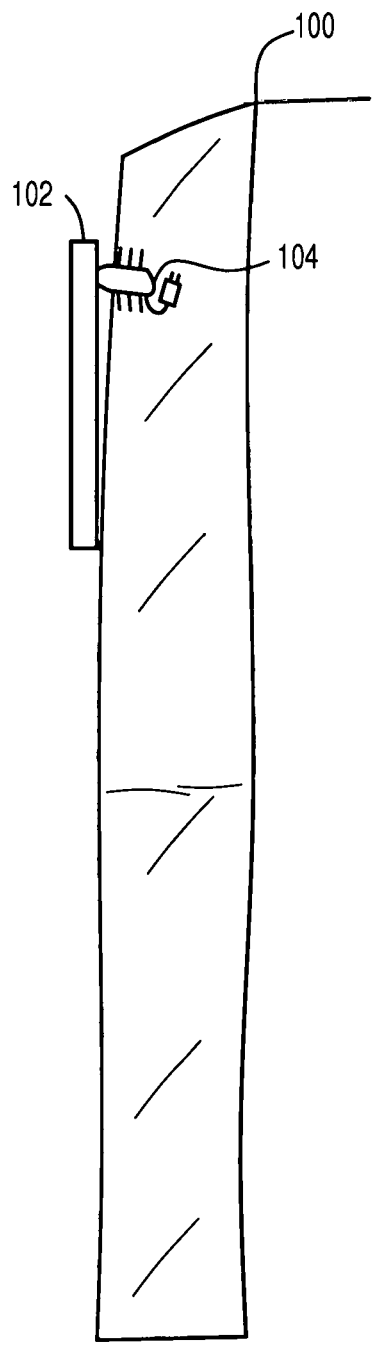
FIG. 10 shows a side view of a door used in an embodiment of the present invention.

FIG. 10 shows a door 100 showing a monitor 102 which slides into an existing door peephole 104.

The invention claimed is:

1. A Smart Door Device, comprising:
   a fully automated single high definition digital compact surveillance unit,
   the surveillance unit being a two-piece device wherein all parts are internal, configured for monitoring activity around an outside and inside of an apartment door;
   information database system configured to transmit and receives data;
   the surveillance unit further comprises:
   a light sensor for night vision and/or low light,
   an internal toxin detector to measure air quality, detect carbon monoxide, smoke and natural gas;
   a motion sensor touch screen,
   an intercom with a LED-scrolling display, the display capable of playing music;
   an internal computer board arranged in between said two-piece device;
   an outside digital part that is mounted through a hole in an upper center of the door wherein a flat interlocking nut is screwed onto said outside digital part from the inside of the door, connected to the surveillance unit, making the surveillance unit a signal digital surveillance unit;
   round eyeball shape high definition digital camera lens configured to have zoom in and zoom out capability and further comprise an actuator to automatically zoom in on key features of a person standing outside the door;
   a rotating lens coupled to the actuator to rotate up and down to sense sound and motion outside of the door;
   the camera lens can further distinguish key features on a visitor outside the door such as, apparel design, person height, color pattern and/or physical attribute;
   a speaker that can ask the visitor for providing an identification and the camera lens further to read the identification and verify it with a database of stored credentials;
   wherein when the identification doesn't match the stored credential, the surveillance unit having cellular capability to call and/or send a message to a homeowner and/or law enforcement;
   an internal scanner comprising a touch screen wherein the scanner can verify the credentials by fingerprint, image scan and/or reading a barcode from a name tag;
   the surveillance unit having a GPS device for communicating with a mobile device of a homeowner and can determine the location of the homeowner and if the homeowner isn't located inside the house it estimates time of arrival of the homeowner and the display device communicates with the visitor using an aviator;
   the aviator is capable of bi-directional communication with the visitor and ask questions and display material to the visitors liking; the aviator can also start a video chat with the homeowner's mobile phone;
   wherein the aviator using the speaker tells the visitor to leave the vicinity if the visitor appears to be an unwanted guest based on the verification of the identification and
   determining if the visitor is a criminal and/or sex offender by searching an online database and if the identification matches with online database, calling law enforcement and if the identification matches with the stored guest list, opening the door for the visitor to enter the house.

2. The digital surveillance unit of claim 1 further including a power cord to power all the integral parts of the computer board and circuit inside the unit.

3. The digital surveillance unit of claim 1 further including a backup battery.

4. The digital surveillance unit of claim 1 further displaying a low battery charge on the display unit.

5. The digital surveillance unit of claim 1 further including a passcode for the homeowner to activate and deactivate the unit.

6. The digital surveillance unit of claim 1 further communicating with a mobile device of the homeowner, the homeowner capable of accessing the surveillance using the mobile device and can further update, edit, delete and add visitor credentials.

\* \* \* \* \*